United States Patent
Nagano et al.

(10) Patent No.: US 7,226,222 B2
(45) Date of Patent: Jun. 5, 2007

(54) LASER MODULE WITH SEALED PACKAGES HAVING REDUCED TOTAL VOLUME

(75) Inventors: Kazuhiko Nagano, Kanagawa-ken (JP); Hideo Miura, Kanagawa-ken (JP); Shinichiro Sonoda, Kanagawa-ken (JP)

(73) Assignee: Fujifilm Corporation, Tokyo (JP)

( * ) Notice: Subject to any disclaimer, the term of this patent is extended or adjusted under 35 U.S.C. 154(b) by 0 days.

(21) Appl. No.: 11/197,592

(22) Filed: Aug. 5, 2005

(65) Prior Publication Data

US 2006/0034571 A1  Feb. 16, 2006

(30) Foreign Application Priority Data

Aug. 13, 2004  (JP)  ............................. 2004-235944

(51) Int. Cl.
*G02B 6/36* (2006.01)
(52) U.S. Cl. ............................. 385/94; 385/88; 385/92; 385/93
(58) Field of Classification Search .................. 385/88, 385/92–94
See application file for complete search history.

(56) References Cited

U.S. PATENT DOCUMENTS

| | | | | |
|---|---|---|---|---|
| 4,749,250 A | * | 6/1988 | Carter | .......................... 385/52 |
| 5,392,305 A | | 2/1995 | Jakobson | |
| 5,845,031 A | * | 12/1998 | Aoki | ............................ 385/92 |
| 5,940,564 A | * | 8/1999 | Jewell | ........................... 385/93 |
| 6,040,934 A | * | 3/2000 | Ogusu et al. | ............... 398/139 |
| 2001/0055451 A1 | * | 12/2001 | Kuhara et al. | ................ 385/93 |
| 2003/0044132 A1 | * | 3/2003 | Nasu et al. | .................... 385/92 |
| 2006/0018609 A1 | * | 1/2006 | Sonoda et al. | ................ 385/93 |

FOREIGN PATENT DOCUMENTS

| | | |
|---|---|---|
| JP | 11-54852 A | 2/1999 |
| JP | 11-167132 A | 6/1999 |
| JP | 2003-298170 A | 10/2003 |

* cited by examiner

*Primary Examiner*—Michelle Connelly-Cushwa
*Assistant Examiner*—Rhonda S. Peace
(74) *Attorney, Agent, or Firm*—Sughrue Mion, PLLC

(57) ABSTRACT

In a laser module in which laser beams emitted from semiconductor laser elements are collimated by collimator lenses, and condensed by an optical condensing system so that the laser beams converge at a light-entrance end face of an optical fiber. The semiconductor laser elements and the collimator lenses are contained in a hermetically sealed, first package which includes a front wall having a window arranged for passage of the laser beams, and a portion of the optical condensing system and the light-entrance end face are contained in a hermetically sealed, second package which is fixed to the front wall. The cross section of the second package perpendicular to the optical axis of the optical fiber at the light-entrance end face is smaller than the cross section of the first package parallel to the cross section of the second package.

18 Claims, 8 Drawing Sheets

LASER MODULE WITH SEALED PACKAGES HAVING REDUCED TOTAL VOLUME

BACKGROUND OF THE INVENTION

1. Field of the Invention

The present invention relates to a laser module in which at least one laser beam emitted from at least one semiconductor laser element is coupled to an optical fiber.

2. Description of the Related Art

Conventionally, the laser modules known as the pigtail-type laser modules have been widely used in the field of optical communications. The pigtail-type laser modules are constituted by a semiconductor laser element contained in a package, an optical fiber being fixed to the package and having an end (light-entrance end) which appears inside the package, and an optical condensing system which couples a laser beam emitted from the semiconductor laser element with the optical fiber at the light-entrance end face.

As a variation of the above pigtail-type laser modules, the combined-laser modules are also known, for example, as indicated in Japanese Unexamined Patent Publication No. 2003-298170. In the combined-laser modules, a plurality of laser beams are emitted from one or more semiconductor laser elements, and enter an optical fiber which is arranged as in the pigtail-type laser modules, so that the plurality of laser beams are combined into a single laser beam having high intensity.

In the above laser modules, in order to stably maintain the state in which the semiconductor laser and the light-entrance end face of the optical fiber are optically coupled with a precision on the order of micrometers, the optical fiber, the optical condensing system, and the like are normally fixed by using a means of adhesion such as a solder or an adhesive.

In addition, in the laser modules for communications, in order to prevent deterioration of the laser caused by moisture in the atmosphere and the like, normally the package is hermetically sealed. The so-called CAN package is a typical sealing structure which protects semiconductor laser elements and laser end facets. Japanese Unexamined Patent Publication No. 2003-298170 also discloses hermetic sealing of a package containing the aforementioned one or more semiconductor laser elements and optical fiber, an optical condensing system, and the like.

In the laser modules as mentioned above, contaminants remaining in the hermetically sealed package are likely to be deposited on the light-emission end face of the semiconductor laser element and other optical components such as the optical condensing system and the optical fiber, so that the laser characteristics deteriorate. In particular, in the regions through which light passes and in which the optical density is high, the effect of depositing materials (i.e., the dust collection effect) is enhanced. Further, in the laser modules containing semiconductor laser elements which emit laser beams in the wavelength range of 350 to 500 nm (e.g., in the 400 nm band) such as GaN semiconductor laser elements, the photon energy is high. Therefore, photochemical reactions with the deposited materials are likely to occur, and the dust collection effect becomes further enhanced.

Typical examples of the contaminants are hydrocarbon compounds which enter the package from ambient atmospheres during manufacturing processes. The laser light polymerizes or decomposes such hydrocarbon compounds, and the materials produced by the polymerization or decomposition are deposited and impede increase in the optical output power.

In addition, it is known that ultraviolet light causes photochemical reactions with low-molecular-weight siloxane suspended in air, and the reaction products SiOx are deposited on optical glass window elements. Therefore, periodic replacement of the window elements exposed to air is recommended, for example, as indicated in Japanese Unexamined Patent Publication No. 11 (1999)-054852.

Various proposals have been made for suppressing the aforementioned dust collection effect. For example, U.S. Pat. No. 5,392,305 indicates a proposal to mix 100 ppm or higher of oxygen into sealing gas for decomposing the hydrocarbon compounds and the like.

Further, in optical systems in which ultraviolet light having a wavelength of 400 nm or smaller is applied to optical elements, arrangement of the optical elements in an atmosphere containing 99.9% or more nitrogen has been proposed, for example, as indicated in Japanese Unexamined Patent Publication No. 11 (1999)-167132.

Furthermore, it is known that the dust collection effect can be suppressed by degassing the inside of the package immediately before hermetically sealing the package.

However, in the case where a laser module in which a commercially available optical fiber covered with a primary coating of an ultraviolet-light-curing resin and a secondary coating of a polymer is fixed to a package, degassing is performed after the optical fiber is fixed to the package. That is, the fiber coatings exist in a degassing system. Therefore, chemical components are outgassed during the degassing operation, and thus the inside of the laser module is contaminated with the outgassed chemical components. In order to prevent this contamination, all the coatings of the optical fiber may be removed in advance. Nevertheless, since the optical fiber without coatings is prone to break, and it is difficult to handle an optical fiber without coatings, the removal of the coatings is not practical.

As indicated in Japanese Unexamined Patent Publication No. 2003-298170, hermetic sealing of a package containing a semiconductor laser element, an optical fiber, an optical condensing system, and the like is effective at preventing contamination of the inside of the laser module. However, in this case, the volume of the package becomes considerably large. When the volume of a hermetically sealed package is increased, the cost of the package is also increased, and assembly becomes more difficult. Therefore, in the case where a laser module is produced by hermetically sealing a large package containing a semiconductor laser element, an optical fiber, an optical condensing system, and the like, the cost of the laser module becomes very high.

SUMMARY OF THE INVENTION

The present invention has been developed in view of the above circumstances.

An aspect of the present invention provides a laser module which can achieve high reliability by suppressing deposition of contaminants, and can be produced at low cost.

According to the aspect of the present invention, there is provided a laser module comprising: one or more semiconductor laser elements which emit one or more divergent laser beams; one or more collimator lenses which collimate the one or more divergent laser beams to obtain one or more collimated laser beams; an optical condensing system which is constituted by one or more lenses, condenses the one or more collimated laser beams, and make the one or more collimated laser beams converge at a convergence position; an optical fiber which has a light-entrance end face and is arranged in such a manner that the convergence position is located on the light-entrance end face; a first package which contains the one or more semiconductor laser elements and the one or more collimator lenses, is hermetically sealed, and has a wall in which a window is formed so as to allow passage of the one or more collimated laser beams through the window, and a first cross section perpendicular to the optical axis of the optical fiber at the light-entrance end face; and a second package which is fixed to the wall, has a second cross section parallel to and smaller than the first cross section, contains at least a portion of the one or more lenses constituting the optical condensing system and a portion of the optical fiber containing the light-entrance end face, and is hermetically sealed.

In addition, there is also provided a laser module comprising: one or more semiconductor laser elements which emit one or more divergent laser beams; one or more condensing lenses which condense the one or more divergent laser beams so as to make the one or more divergent laser beams converge at a convergence position; an optical fiber which has a light-entrance end face and is arranged in such a manner that the convergence position is located on the light-entrance end face; a first package which contains the one or more semiconductor laser elements and the one or more condensing lenses, is hermetically sealed, and has a wall in which a window is formed so as to allow passage, through the window, of the one or more divergent laser beams condensed by the one or more condensing lenses, and a first cross section perpendicular to the optical axis of the optical fiber at the light-entrance end face; and a second package which is fixed to the wall, has a second cross section parallel to and smaller than the first cross section, contains a portion of the optical fiber containing the light-entrance end face, and is hermetically sealed.

(II) The laser modules according to the first and second aspects of the present invention have the following advantages.

(1) The optical density is high and the dust collection effect is enhanced at the light-emission end faces of the one or more semiconductor laser elements and the lens surfaces through which light passes. In the laser modules according to the present invention, the one or more semiconductor laser elements and the one or more collimator lenses (or the one or more condensing lenses) are contained in the first package, and the first package is hermetically sealed. Therefore, it is possible to suppress dust collection at the light-emission end faces of the one or more semiconductor laser elements and the lens surfaces through which light passes. Thus, the laser modules according to the present invention are highly reliable.

In addition, a portion of the optical fiber containing the light-entrance end face is contained in the second package in the laser modules according to the first and second aspects of the present invention, and the at least a portion of the one or more lenses constituting the optical condensing system is also contained in the second package in the laser module according to the first aspect of the present invention. Therefore, it is possible to suppress dust collection at the light-entrance end face of the optical fiber and the lens surfaces through which light passes. Thus, the reliability of the laser modules according to the present invention is further improved.

(2) According to the present invention, the second package having a smaller cross section than the first package is fixed to the wall of the first package in which the window is formed. Therefore, the total volume of the first and second packages in each of the laser modules according to the first and second aspects of the present invention is smaller than the volume of the single package in the conventional laser modules which contains all the optical components constituting each laser module (including the portion of the optical fiber containing the light-entrance end face and the portion of the one or more lenses constituting the optical condensing system). Since the cost of the hermetically sealed package markedly increases with the volume of the package, the total cost of the packages according to the present invention can be significantly reduced. Thus, the entire laser modules according to the present invention can be produced at low cost.

DESCRIPTION OF THE PREFERRED EMBODIMENTS

Figure 1:
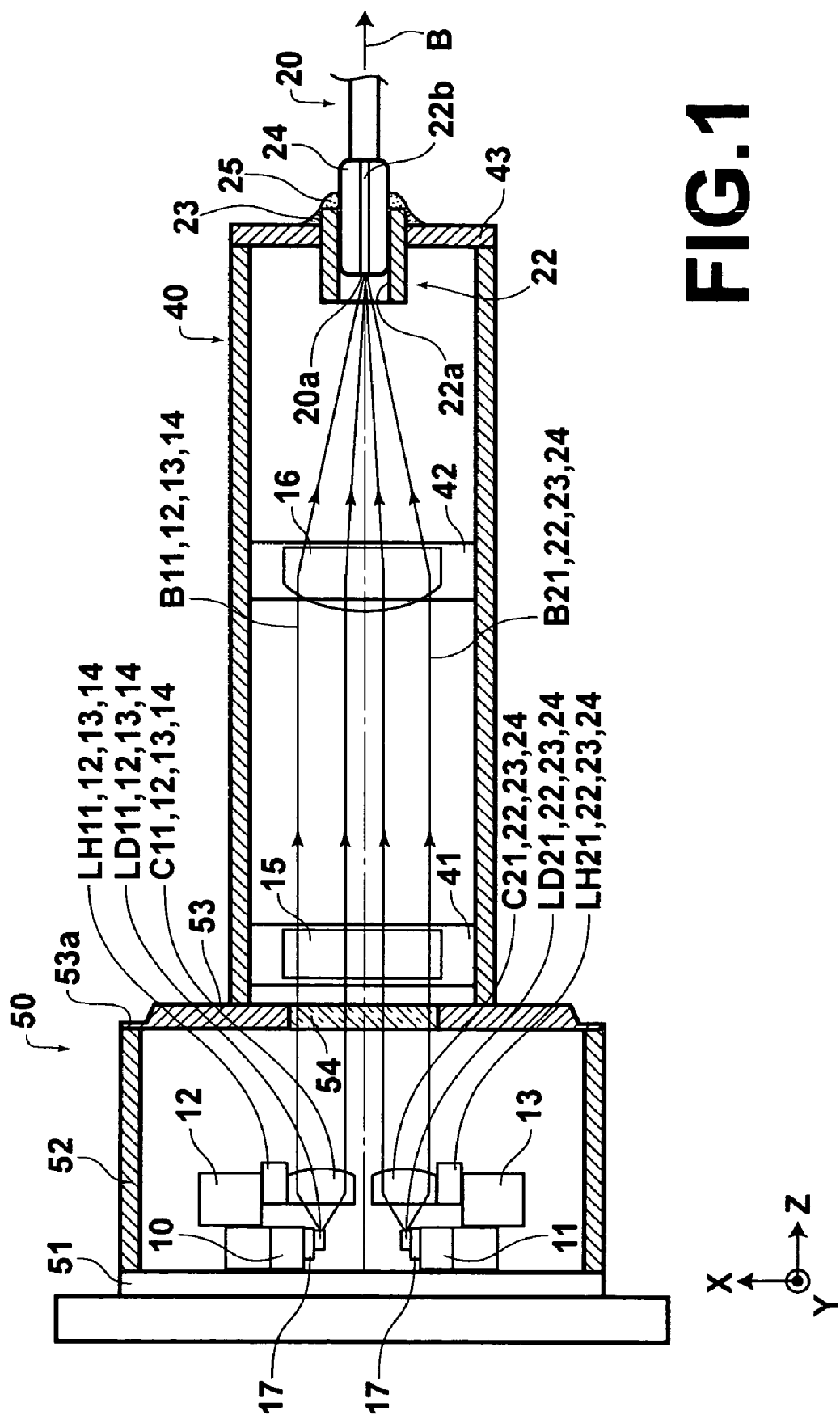
FIG. 1 is a plan view, partly in cross section, of a laser module according to a first embodiment of the present invention.

Embodiments of the present invention are explained in detail below with reference to drawings. In the drawings, equivalent elements and constituents are indicated by the same reference numbers even in drawings for different embodiments, and descriptions of the equivalent elements or constituents are not repeated in the following explanations unless necessary.

First Embodiment

Figure 2:
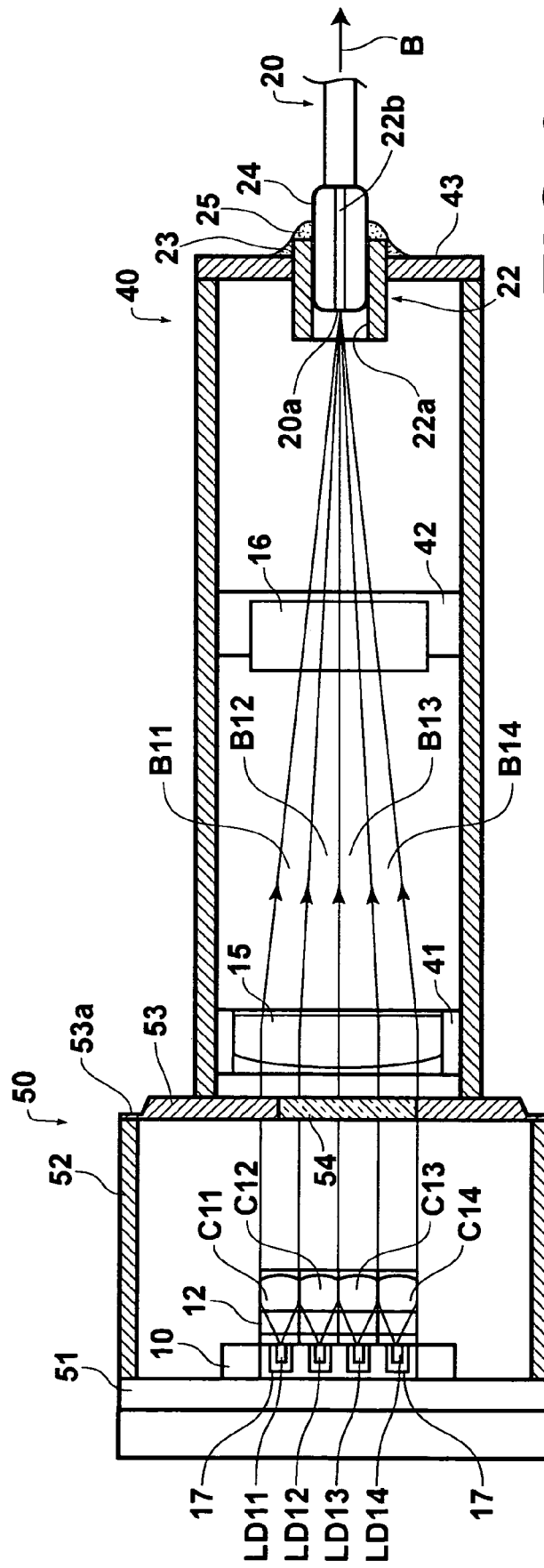
FIG. 2 is a side view, partly in cross section, of the laser module according to the first embodiment.

FIGS. 1 and 2 are respectively plan and side views, partly in cross section, of a laser module according to the first embodiment of the present invention. The laser module according to the first embodiment is an example in which semiconductor laser elements are stacked in the vertical direction. In the laser module according to the first embodiment, as illustrated in FIGS. 1 and 2, eight semiconductor laser elements are stacked in upper and lower layers. Specifically, four semiconductor laser elements LD11, LD12, LD13, and LD14 are fixed to an inner side surface of an LD block 10 with a brazing filler metal so as to be arranged along a horizontal direction in the upper layer, and four semiconductor laser elements LD21, LD22, LD23, and LD24 are fixed to an inner side surface of an LD block 11 with a brazing filler metal so as to be arranged along the horizontal direction in the lower layer. The LD blocks 10 and 11 are made of copper. The semiconductor laser elements LD11, LD12, LD13, LD14, LD21, LD22, LD23, and LD24 emit divergent laser beams B11, B12, B13, B14, B21, B22, B23, and B24, respectively.

In addition, the laser module of FIGS. 1 and 2 comprises collimator lenses C11, C12, C13, C14, C21, C22, C23, and C24, lens holders LH11, LH12, LH13, LH14, LH21, LH22, LH23, and LH24, heat blocks (heat-dissipation blocks) 12 and 13, a package-base plate 51. The heat blocks 12 and 13 are made of copper.

The collimator lenses C11, C12, C13, and C14 respectively collimate the divergent laser beams B11, B12, B13, and B14, and the lens holders LH11, LH12, LH13, and LH14 respectively hold the collimator lenses C11, C12, C13, and C14. The lens holders LH11, LH12, LH13, and LH14 are fixed to the heat block 12, which is fixed to the LD block 10. The collimator lenses C21, C22, C23, and C24 respectively collimate the divergent laser beams B21, B22, B23, and B24, and the lens holders LH21, L122, LH23, and LH24 respectively hold the collimator lenses C21, C22, C23, and C24. The lens holders LH21, LH22, LH23, and LH24 are fixed to the heat block 13, which is fixed to the LD block 11. The LD blocks 10 and 11 are fixed on the package-base plate 51, which constitutes a first package 50.

Each of the collimator lenses C11, C12, C13, C14, C21, C22, C23, and C24 is a truncated lens, for example, having an effective width of 1.12 mm, an effective height of 3.6 mm, and a focal length of 3 mm. The collimator lenses C11, C12, C13, and C14 are arrayed and fixed with a spacing of 0.15 mm, and the collimator lenses C21, C22, C23, and C24 are also arrayed and fixed similarly.

The surface of the heat block 12 on which the lens holders LH11, LH12, LH13, and LH14 are fixed is precisely smoothed in advance into a highly flat surface with a flatness of 0.3 micrometers or smaller. In the above structure in which the collimator lenses C11, C12, C13, and C14 are fixed to the heat block 12 through the lens holders LH21, LH22, LH23, and LH24, the positions of the collimator lenses C11, C12, C13, and C14 in the y and z directions (indicated on FIG. 1) can be adjusted by adjusting the positions of the lens holders LH21, LH22, LH23, and LH24 before fixing the lens holders LH21, LH22, LH23, and LH24. In addition, in the structure in which the heat block 12 is fixed to the LD block 10, the positions of the collimator lenses C11, C12, C13, and C14 in the x and y directions (indicated on FIG. 1) can be adjusted by adjusting the position of the heat block 12 before fixing the heat block 12. In this embodiment, the precision in fixing the lenses is ±0.5 micrometers in the x and y directions, and 1 micrometer in the z direction. Further, the heat block 13 is prepared in a similar manner to the heat block 12, and the positions of the collimator lenses C21, C22, C23, and C24 are adjusted on the heat block 13 in a similar manner to the collimator lenses C11, C12, C13, and C14.

The first package 50 is constituted by the package-base plate 51, side walls 52, and a cover plate 53. The side walls 52 are fixed on the package-base plate 51 so as to cover the four sides of the first package 50, and the cover plate 53 is fixed to the edges of the side walls 52. The first package 50 contains the semiconductor laser elements LD11, LD12, LD13, LD14, LD21, LD22, LD23, and LD24, the collimator lenses C11, C12, C13, C14, C21, C22, C23, and C24, the lens holders LH11, LH12, LH13, LH14, LH21, LH22, LH23, and LH24, the heat blocks 12 and 13, and the LD blocks 10 and 11, and is hermetically sealed. A transparent plate 54 made of optical glass or the like is inserted in the cover plate 53 so that the laser beams B11, B12, B13, B14, B21, B22, B23, and B24 can output from the first package 50 through the transparent plate 54.

Further, the laser module of FIGS. 1 and 2 comprises cylindrical lenses 15 and 16 and an optical fiber 20. The cylindrical lens 15 condenses within the plane of FIG. 2 the collimated laser beams B11, B12, B13, B14, B21, B22, B23, and B24 outputted from the first package 50 through the transparent plate 54, and the cylindrical lens 16 condenses within the plane of FIG. 1 the laser beams B11, B12, B13, B14, B21, B22, B23, and B24 condensed by the cylindrical lens 15. The optical fiber 20 is arranged in such a manner that the laser beams B11, B12, B13, B14, B21, B22, B23, and B24 condensed by the cylindrical lenses 15 and 16 converge on one end (light-entrance end face) 20a of the optical fiber 20.

The cylindrical lenses 15 and 16 are respectively fixed to the lens holders 41 and 42, which are fixed to a second package 40. The second package 40 contains the lens holders 41 and 42 and the cylindrical lenses 15 and 16, and is hermetically sealed. The second package 40 has a front plate 43, to which a ferrule holder 22 having a cylindrical ferrule-holding passage 22a is fixed, for example, with a flux-free solder 23. The resin coating of the optical fiber 20 in the vicinity of the light-entrance end face 20a is removed so as to expose the bare optical fiber 20b. The bare optical fiber 20b is inserted into a small hole formed through the center of a cylindrical ferrule 24, and the ferrule 24 is fixed to the ferrule holder 22 with a flux-free solder 25. Thus, the optical fiber 20 is fixed to the second package 40.

GaN-based semiconductor laser elements having an oscillation wavelength of 350 to 500 nm are used as the semiconductor laser elements LD11, LD12, LD13, LD14, LD21, LD22, LD23, and LD24, and mounted on the heat blocks 10 and 11 through submounts 17. For example, the InGaN-based semiconductor laser elements disclosed in Japanese Unexamined Patent Publication No. 2004-134555 can be used as the semiconductor laser elements LD11, LD12, LD13, LD14, LD21, LD22, LD23, and LD24. For example, the submounts 17 may be made of a composite material of steel and diamond having a thermal conductivity of 600 W/mK, and have dimensions of 1×1×0.25 mm. The use of the above submounts 17 facilitates thermal diffusion from the active layers of the semiconductor laser elements LD11, LD12, LD13, LD14, LD21, LD22, LD23, and LD24, at which the heat generation density is high. Thereby, it is possible to suppress temperature rise during driving of the semiconductor laser elements LD11, LD12, LD13, LD14, LD21, LD22, LD23, and LD24, and improve reliability of the semiconductor laser elements LD11, LD12, LD13, LD14, LD21, LD22, LD23, and LD24. The submounts 17 can be mounted in various manners. For example, the submounts 17 may be directly fixed to the heat blocks 10 and 11 by soldering. Alternatively, a submount may be mounted for more then one component of the laser module.

The semiconductor laser elements LD11, LD12, LD13, LD14, LD21, LD22, LD23, and LD24 are connected to leads (not shown) through electrode pads (not shown) to which the leads are bonded, and the leads are led out of the first package 50 so that the inside of the first package 50 is sealed off from the outside.

In the laser module according to the first embodiment, the cylindrical lenses 15 and 16 realize a condensing lens system which makes the laser beams B1, B12, B13, B14, B21, B22, B23, and B24 converge on the light-entrance end face 20a of the optical fiber 20. Thereby, the circularity of each of the laser beams B11, B12, B13, B14, B21, B22, B23, and B24 is increased. Alternatively, as appropriate, the condensing lens system may be realized by a normal axisymmetric spherical lens, an aspherical lens, a truncated lens having a shape obtained by cutting out a portion of an axisymmetric spherical lens so that the portion contains the optical axis of the axisymmetric spherical lens, or other lenses.

In the laser module having the above construction, the divergent laser beams B11, B12, B13, B14, B21, B22, B23, and B24 emitted from the semiconductor laser elements LD11, LD12, LD13, LD14, LD21, LD22, LD23, and LD24 are collimated by the collimator lenses C11, C12, C13, C14, C21, C22, C23, and C24, respectively, and outputted from the first package 50 through the transparent plate 54. Then, the collimated laser beams B11, B12, B13, B14, B21, B22, B23, and B24 are condensed by the cylindrical lenses 15 and 16 so that all the laser beams B11, B12, B13, B14, B21, B22, B23, and B24 converge on the light-entrance end face 20a (specifically, the end face of the core) of the optical fiber 20. Thus, the laser beams B11, B12, B13, B14, B21, B22, B23, and B24 enter and propagate through the optical fiber 20. At this time, the laser beams B1, B12, B13, B14, B21, B22, B23, and B24 are combined in the optical fiber 20 into a high-intensity, combined laser beam B, which is then outputted from the optical fiber 20.

It is preferable that the light-emission end of the optical fiber 20 be terminated. Details of the termination of the optical fiber are explained later.

As mentioned before, in addition to the laser beams B11, B12, B13, B14, B21, B22, B23, and B24 as forward emission light, the semiconductor laser elements LD11, LD12, LD13, LD14, LD21, LD22, LD23, and LD24 emit the backward emission light (not shown) in the direction opposite to the laser beams B11, B12, B13, B14, B21, B22, B23, and B24. The intensities of the backward emission light from the semiconductor laser elements LD11, LD12, LD13, LD14, LD21, LD22, LD23, and LD24 are detected by photodiodes (not shown), respectively, and the driving currents of the semiconductor laser elements LD11, LD12, LD13, LD14, LD21, LD22, LD23, and LD24 are APC (Automatic Power Control) controlled according to the outputs of the photodiodes, respectively, so that the output power of the combined laser beam B is maintained constant.

Alternatively, in order to perform APC in a laser module having a plurality of semiconductor laser elements, it is possible to input the signals corresponding to the detected backward emission light into a the multi-channel driver, and control the respective semiconductor laser elements by using the multi-channel driver. Further, it is also possible to split off a portion from each of the laser beams B11, B12, B13, B14, B21, B22, B23, and B24 after the laser beams B11, B12, B13, B14, B21, B22, B23, and B24 are outputted from the first package 50 (or after the laser beams B11, B12, B13, B14, B21, B22, B23, and B24 are condensed by the cylindrical lenses 15 and 16) by using a beam splitter or the like, detect the intensities of the split portions of the laser beams B11, B12, B13, B14, B21, B22, B23, and B24 (instead of the backward emission light) by using optical detectors, and perform APC on the basis of the outputs of the optical detectors.

Hereinbelow, prevention of contamination of the surfaces through which the laser beams B11, B12, B13, B14, B21, B22, B23, and B24 pass is explained.

As explained above, the first package 50, which contains the semiconductor laser elements LD11, LD12, LD13, LD14, LD21, LD22, LD23, and LD24 and the collimator lenses C11, C12, C13, C14, C21, C22, C23, and C24, is constituted by the package-base plate 51, the side walls 52, and the cover plate 53, and is hermetically sealed. A flux-free solder or an adhesive which does not contain a silicon-based organic material is used for fixing the constituents of the first package 50 to each other, and the heat blocks 12 and 13 to the package-base plate 51. Alternatively, fusion or welding may be used for fixing the above plates and members. In addition, the other components and parts arranged in the first package 50 are also fixed or bonded in similar manners. Thus, it is possible to suppress emanation of volatile components which causes contamination. Further, it is preferable to perform degassing for removing volatile components remaining in the first package 50, before the hermetic sealing of the first package 50.

The adhesive which does not contain a silicon-based organic material is, for example, one of the adhesive mixtures which are disclosed in Japanese Unexamined Patent Publication No. 2001-177166 and do not contain a silane coupling agent, where each of the adhesive mixtures contains an alicyclic epoxy compound, a compound having an oxetanyl group, and a photoreaction initiator of an onium salt as a catalyst.

The flux-free solders used in the laser module according to the first embodiment are, for example, Sn—Pb, Sn—In, Sn—Pb—In, Au—Sn, Ag—Sn, Sn—Ag—In, or the like. Although the flux contained in the most soldering materials causes contamination, it is possible to prevent production of contaminants by use of the flux-free solders. In addition, from the environmental viewpoint, it is preferable to use lead-free solders.

It is possible to perform welding by using a commercially available, seam welding machine, for example, one of the seam welders which are available from Nippon Avionics Co., Ltd. Specifically, it is possible to perform a seal weld of the first package 50, for example, by placing the cover plate 53 on the edges of the side walls 52, and applying a high voltage to the regions at which the cover plate 53 and the edges of the side walls 52 are in contact, with a seam welding machine. In addition, it is possible to perform fusion by using a commercially available, fusion machine, for example, the fusion machine FITEL S-2000, which is available from Furukawa Electric Co., Ltd.

The laser module according to the first embodiment has the following advantages.

(a) Since the semiconductor laser elements LD11, LD12, LD13, LD14, LD21, LD22, LD23, and LD24 and the collimator lenses C11, C12, C13, C14, C21, C22, C23, and C24 are arranged in the first package 50 which is hermetically sealed so that contaminants inside the first package 50 are sufficiently reduced, it is possible to suppress dust collection on the light-emission end faces of the semiconductor laser elements LD11, LD12, LD13, LD14, LD21, LD22, LD23, and LD24 and the surfaces of the collimator lenses C11, C12, C13, C14, C21, C22, C23, and C24 through which light passes (at which the optical density is high and the dust collection effect is enhanced). Thus, the laser module according to the first embodiment has high reliability.

(b) Since the cylindrical lenses 15 and 16 are contained in the hermetically sealed, second package 40, it is possible to suppress dust collection at the surfaces of the cylindrical lenses 15 and 16 through which light pass.

(c) Since the second package 40 having a smaller cross section than the cover plate 53 of the first package 50 and being hermetically sealed is fixed to the cover plate 53 of the first package 50, the total volume of the first and second packages 50 and 40 can be smaller than the volume of a hermetically sealed package which contains substantially all optical components of a laser module including the cylindrical lenses 15 and 16 and the light-entrance end face 20a of the optical fiber 20 as well as the semiconductor laser elements and the collimator lenses. Since the cost of the hermetically sealed package markedly increases with the volume of the package, the total cost of the first and second packages 50 and 40 can be significantly reduced. Thus, the entire laser module according to the first embodiment can be produced at low cost.

(d) In the case where the cover plate 53 is fixed to the edges of the side walls 52 of the first package 50 by welding, the weld distortion increases with the volume of the weld region. When the weld distortion occurs, misalignment can occur between the optical axes of the optical elements contained in the first package 50, or between the optical elements contained in the first and second packages 50 and 40 because of misalignment between the first and second packages 50 and 40.

Therefore, according to the first embodiment, the thickness of the peripheral portions 53a of the cover plate 53 is small compared with the thickness of the other portion of the cover plate 53 on which the second package 40 is fixed. In this case, when the peripheral portions 53a of the cover plate 53 are fixed to the edges of the side walls 52 of the first package 50 by welding, it is possible to suppress the weld distortion, and prevent the above-mentioned misalignment between the optical axes. In addition, since the portion of the cover plate 53 on which the second package 40 is fixed is thick compared with the peripheral portions 53a of the cover plate 53, it is possible to prevent deformation of the portion of the cover plate 53 on which the second package 40 is fixed, although the cover plate 53 is likely to deform if the strength, against deformation, of the portion of the cover plate 53 on which the second package 40 is fixed is small. For example, the peripheral portions 53a has the width of 0.8 mm, and the thickness of the 0.1 mm, and the other portion of the cover plate 53 on which the second package 40 is fixed has the thickness of 1 mm.

(e) In the laser module according to the first embodiment, the first package is hermetically sealed by using a flux-free solder or an adhesive which does not contain a silicon-based organic material, it is possible to suppress emanation of volatile components which causes contamination, and prevent contamination of the semiconductor laser elements and the like. Alternatively, even in the case where the first package 50 is hermetically sealed by fusion or welding, it is also possible to achieve similar advantages.

Furthermore, the second package 40 can also be hermetically sealed in a similar manner to the first package 50. In this case, it is also possible to achieve advantages similar to the advantages of the hermetically sealing of the first package 50.

(f) In the laser module according to the first embodiment, the laser beams B11, B12, B13, B14, B21, B22, B23, and B24 emitted from the semiconductor laser elements LD11, LD12, LD13, LD14, LD21, LD22, LD23, and LD24 have a wavelength of 350 to 500 nm. That is, the optical energy is great, and the dust collection effect is enhanced. Since the deposition of contaminants is prevented in the laser module according to the first embodiment, the arrangement of the first and second packages according to the first embodiment of the present invention is particularly effective at preventing deposition of contaminants in the laser modules in which laser beams having the above wavelength are used.

(g) Since a plurality of laser beams (the laser beams B11, B12, B13, B14, B21, B22, B23, and B24 emitted by the semiconductor laser elements LD11, LD12, LD13, LD14, LD21, LD22, LD23, and LD24) are combined into a single laser beam in the optical fiber 20, the optical density at the light-entrance end face 20a of the optical fiber 20 becomes very great, and therefore the dust collection effect is enhanced. Since the deposition of contaminants on the light-entrance end face 20a of the optical fiber 20 is prevented by the provision of the second package 40, the provision of the second package 40 is particularly effective at preventing deposition of contaminants in the laser module according to the first embodiment.

(h) In the laser module according to the first embodiment, the first package 50 is filled with inert gas, so that entry of contaminated gas into the first package 50 is prevented. The inert gas may be, for example, nitrogen gas or rare gas. In addition, the inert gas may contain one or a mixture of oxygen gas, halogen gas, and halide gas at a concentration of 1 ppm or higher. For example, the first package 50 may be filled with the clean air, which is a mixture of nitrogen gas and oxygen gas at the same ratio as the atmosphere.

When the oxygen content in the sealed atmosphere is 1 ppm or higher, deterioration of the laser module can be suppressed more effectively. This is because the oxygen contained in the sealed atmosphere oxidizes and decomposes solid materials produced by photodecomposition of hydrocarbon components.

The halogen gas includes chlorine ($Cl_2$) gas, fluorine ($F_2$) gas, and the like, and the halide gas includes gaseous compounds containing a halogen atom such as chlorine (Cl), bromine (Br), iodine (I), or fluorine (F).

Specifically, the halide gas includes $CF_3C_1$, $CF_2Cl_2$, $CFCl_3$, $CF_3Br$, $CCl_4$, $CCl_4$—$O_2$, $C_2F_4Cl_2$, $C_1$—$H_2$, $PCl_3$, $CF_4$, $C_3F_8$, $CHF_3$, and the like. Compounds of fluorine or chlorine with carbon (C), nitrogen (N), sulfur (S), or xenon (Xe) are preferable for use in the present invention, and compounds containing the fluorine atom are particularly preferable.

Although inclusion of even a very small amount of halogen-based gas (halogen or halide gas) produces the effect of suppressing the deterioration of the laser, in order to make the effect prominent, it is preferable that the concentration of halogen-based gas in the sealed atmosphere be 1 ppm or higher. The inclusion of halogen-based gas in the sealed atmosphere suppresses the deterioration of the laser characteristics because the halogen-based gas in the sealed atmosphere decomposes deposited materials which are produced by photodecomposition of organic silicon compound gas.

In addition, it is also preferable that the second package 40 be filled with inert gas as the first package 50, and the inert gas contain one or a mixture of oxygen gas, halogen gas, and halide gas at a concentration of 1 ppm or higher. In this case, it is also possible to achieve advantages similar to those obtained by the composition of the gas with which the first package 50 is filled.

Second Embodiment

Hereinbelow, the second embodiment of the present invention is explained with reference to FIG. 3, which is a plan view, partly in cross section, of a laser module according to the second embodiment of the present invention.

The laser module according to the second embodiment is basically different from the first embodiment in that eight condensing lenses EC11, EC12, EC13, EC14, EC21, EC22, EC23, and EC24 are used instead of the eight collimator lenses C11, C12, C13, C14, C21, C22, C23, and C24, and the cylindrical lenses 15 and 16 are dispensed with. The other portions of the laser module according to the second embodiment is basically identical to the laser module according to the first embodiment.

Figure 3:
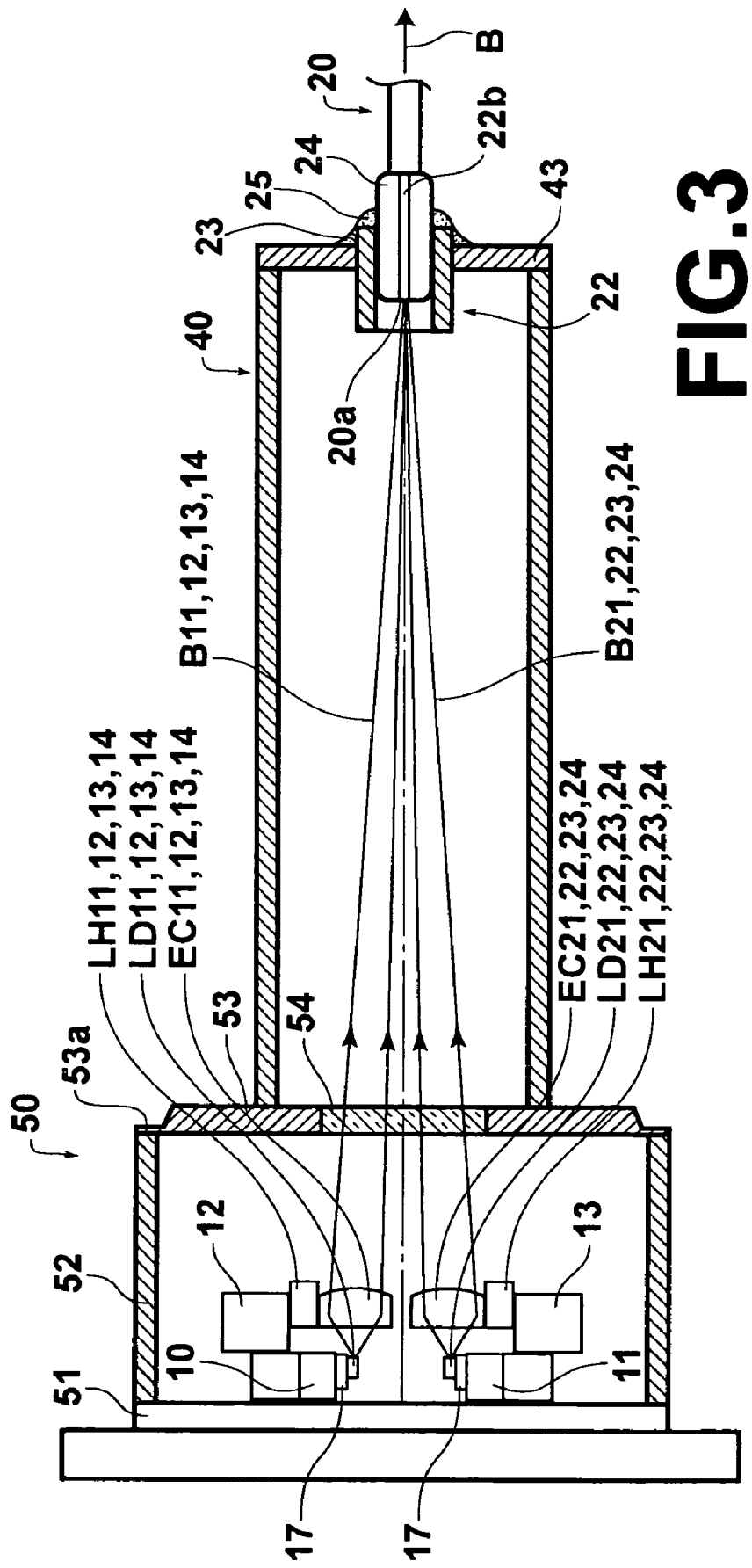
FIG. 3 is a plan view, partly in cross section, of a laser module according to a second embodiment of the present invention.

As illustrated in FIG. 3, in the laser module according to the second embodiment, the laser beams B11, B12, B13, B14, B21, B22, B23, and B24 emitted from the semiconductor laser elements LD11, LD12, LD13, LD14, LD21, LD22, LD23, and LD24 are respectively collimated by the condensing lenses EC11, EC12, EC13, EC14, EC21, EC22, EC23, and EC24, and converge on the core end face in the light-entrance end face 20a of the optical fiber 20. Thus, the laser beams B11, B12, B13, B14, B21, B22, B23, and B24 enter and propagate through the optical fiber 20, so that the laser beams B11, B12, B13, B14, B21, B22, B23, and B24 are combined and the combined laser beam B is outputted from the optical fiber 20 with high intensity.

Since the semiconductor laser elements LD11, LD12, LD13, LD14, LD21, LD22, LD23, and LD24 and the condensing lenses EC11, EC12, EC13, EC14, EC21, EC22, EC23, and EC24 are contained in the first package 50, it is possible to prevent contamination of the semiconductor laser elements LD11, LD12, LD13, LD14, LD21, LD22, LD23, and LD24 and the condensing lenses EC11, EC12, EC13, EC14, EC21, EC22, EC23, and EC24 in a basically similar manner to the prevention of contamination of the semiconductor lasers and the collimator lenses in the first embodiment.

Termination and Connection of Optical Fiber

Hereinbelow, termination of the optical fiber 20 and structures for connecting optical fibers are explained with reference to FIGS. 4 to 8. The optical fiber 20 in each of FIGS. 4 to 8 is an optical fiber which is terminated, and corresponds to the optical fiber 20 in either of the laser modules according to the first and second embodiments.

<First Structure>

First, the first structure for connecting optical fibers and a manner of termination using the first structure are explained below with reference to FIG. 4, which is a cross-sectional side view of the first structure for connecting optical fibers.

Figure 4:
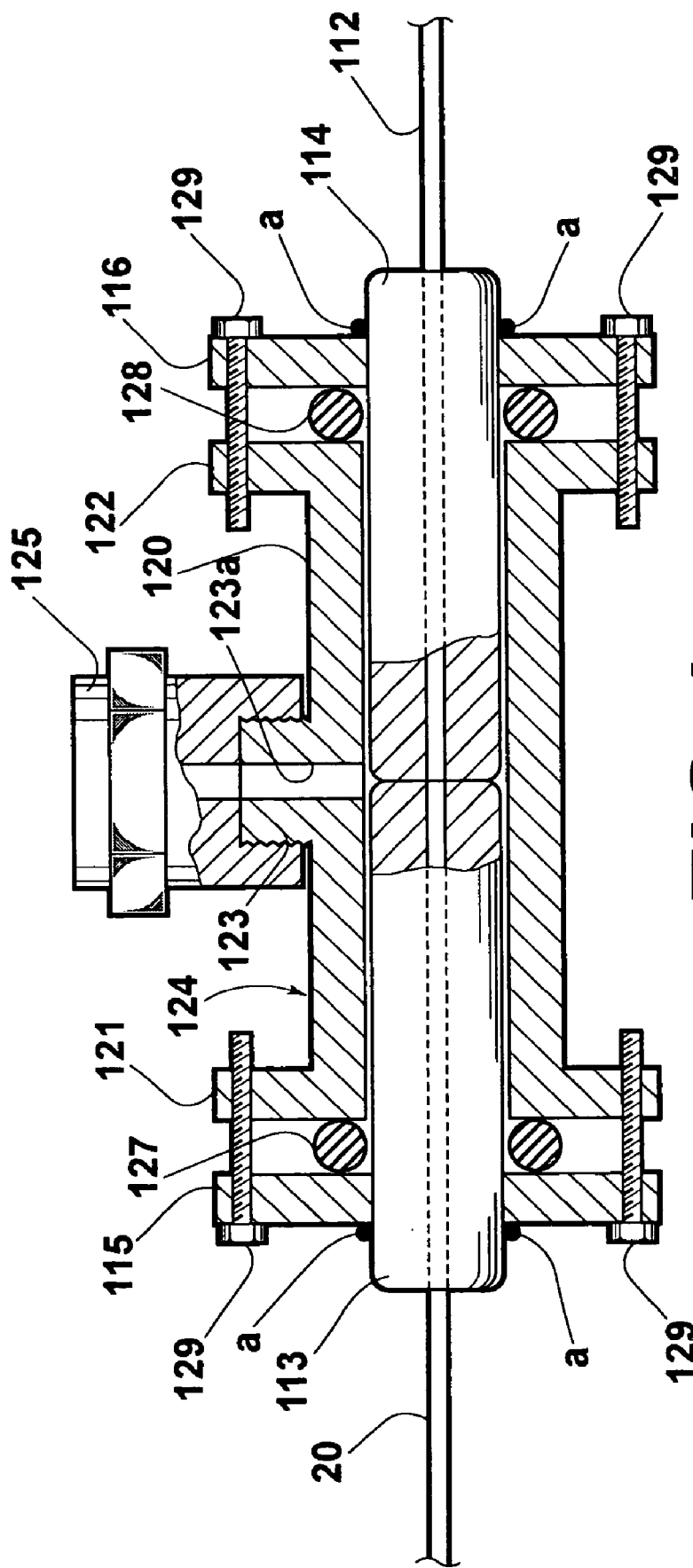
FIG. 4 is a cross-sectional side view of a first structure for connecting optical fibers.

In the first structure illustrated in FIG. 4, near-end portions of two optical fibers 20 and 112 are respectively inserted into and fixed to the ferrules 113 and 114, and flanges 115 and 116 each having an annular shape are fixed to the ferrules 113 and 114 at vicinities of the rear ends of the ferrules 113 and 114, respectively. An O-ring 127 is placed around the ferrule 113 in contact with the inner face of the flange 115, and an O-ring 128 is placed around the ferrule 114 in contact with the inner face of the flange 116. The ferrules 113 and 114 are inserted into a sleeve tube 120 constituting a connector 124 from both ends of the sleeve tube 120. That is, the termination of the optical fiber 20 is realized by the attachment of the ferrule 113.

The ferrules 113 and 114 are formed of ceramic, glass, metal, or a combination of the ceramic, glass, and metal. In the case where the ferrules 113 and 114 are formed of ceramic or glass, it is preferable to metalize the side surfaces of the ferrules 113 and 114 by metal plating or sputtering. After the ferrules 113 and 114 are fixed to the optical fibers 20 and 112, the tips of the ferrules 113 and 114 are polished into a spherical or planar shape.

The sleeve tube 120 constituting the connector 124 has an internal diameter slightly greater than the external diameter of the ferrules 113 and 114. Flanges 121 and 122 are formed at both ends of the sleeve tube 120, and a gas-introduction portion 123 having a through hole 123a which connects the inside and the outside of the sleeve tube 120 is arranged at approximately the middle of the length of the sleeve tube 120. A screw thread is formed on the external surface of the gas-introduction portion 123, and a valve 125 for closing the through hole 123a is fixed to the gas-introduction portion 123 by screwing the valve 125 onto the gas-introduction portion 123.

The flanges 115 and 116 are fixed to the ferrules 113 and 114 so that the gaps between the flanges 115 and 116 and the ferrules 113 and 114 are sealed along the entire circumferences of the ferrules 113 and 114, respectively, for example, at the positions indicated by black circles a in FIG. 4 by using, for example, a solder, which is preferably a flux-free solder not emanating organic gas.

After the ferrules 113 and 114 are inserted into the sleeve tube 120 of the connector 124 from the front portions of the ferrules 113 and 114, the flanges 115 and 116 are fixed to the flanges 121 and 122 through the O-rings 127 and 128, respectively, with an appropriate number of bolts 129. Thus, the inside of the connector 124 is sealed off from the outside with the O-rings 127 and 128 and the flanges 115 and 116. In addition, at this time, tips of the optical fiber cores are brought into contact with and pressed against each other, and the tips of the optical fiber cores are coaxially aligned. Thus, the optical fibers 20 and 112 are optically connected. Further, it is preferable that the O-rings 127 and 128 are made of a fluorocarbon polymer.

While the operation of connecting the optical fibers 20 and 112 is performed, inert gas is introduced into the connector 124 by placing the connector 124 in an atmosphere of inert gas as mentioned before, connecting the valve 125 to a vacuum pump (not shown), and reducing the internal pressure of the connector 124. Thereafter, the valve 125 is closed. Thus, when the inside of the connector 124 is sealed up by inserting the ferrules 113 and 114 as mentioned before, the inside of the connector 124 is filled with the inert gas.

In the case where the connector 124 is filled with the inert gas as above, and at least portions of the tips of the cores of the optical fibers 20 and 112 are not in contact, the at least portions are surrounded by the inert gas. Therefore, organic materials and the like which cause the aforementioned dust collection effect do not exist around the tips of the optical fibers 20 and 112, and thus the light propagating through the optical fibers 20 and 112 does not cause the photochemical reaction. That is, the dust collection effect at the tips of the optical fibers 20 and 112 can be suppressed.

In this example, laser light having a wavelength in the range of 350 to 500 nm, which is likely to cause the dust collection effect, propagates through the optical fibers 20 and 112. Therefore, use of the structure illustrated in FIG. 4 is particularly effective.

In the case where the inside of the connector 124 is degassed before the inert gas is introduced into the connector 124, it is possible to suppress the dust collection effect with higher reliability.

In the structure illustrated in FIG. 4, the optical fibers 20 and 112 are not fused. Therefore, the optical fibers 20 and 112 can be easily connected without an elaborated fusion machine. In addition, the ferrules 113 and 114 can be easily detached from the connector 124 by loosening and taking out the bolts 129. Thus, it is possible to easily reconnect the optical fibers 20 and 112 after the optical fibers are once connected.

Further, in the structure illustrated in FIG. 4, the optical fibers 20 and 112 can be automatically brought into coaxial alignment by simply inserting the ferrules 113 and 114 into the sleeve tube 120, which guides the ferrules 113 and 114. Therefore, the operation for aligning the optical fibers can be performed easily.

Nitrogen gas and rare gas are preferable examples of the inert gas used in the above structure for connection of optical fibers. In addition, it is preferable that the inert gas contain one or a mixture of oxygen gas, halogen gas, and halide gas at a concentration of 1 ppm to 30%. The examples of the halogen gas and halide gas which are indicated before to be preferable for use in the package 50 in the first embodiment are also preferable for use in the structure of FIG. 4.

When the oxygen content in the inert gas is 1 ppm or higher, deterioration of the optical fibers 20 and 112 can be suppressed more effectively. This is because the oxygen contained in the inert gas oxidizes and decomposes solid materials produced by photodecomposition of hydrocarbon components. Alternatively, in order to contain oxygen in the sealed atmosphere, it is possible to fill the connector 124 with the clean air (i.e., the mixed gas having the composition of the atmosphere).

Alternatively, when one or both of halogen gas and halide gas are contained in the inert gas, the inclusion of the halogen gas or halide gas in the inert gas can also effectively suppress deterioration of the optical fibers 20 and 112 as the inclusion of oxygen gas. Although inclusion of even a very small amount of halogen or halide gas (halogen-based gas) produces the effect of suppressing the deterioration of the optical fibers 20 and 112, in order to make this effect prominent, it is preferable that the concentration of halogen or halide gas in the sealed atmosphere be 1 ppm or higher. The inclusion of halogen or halide gas in the sealed atmosphere suppresses the deterioration of the optical fibers 20 and 112 because the halogen or halide gas in the sealed atmosphere decomposes deposited materials which are produced by photodecomposition of organic silicon compound gas.

Since the tips of the optical fibers 20 and 112 are fixed so as to be in close contact, it is unnecessary to coat the tips with films. In the case where the tips are not coated with films, no step like change occurs in the refraction index, and normally the coupling efficiency of the propagation light is maximized.

However, it is possible to coat the tips with films when necessary. In this case, if the outermost layers of the films are made of a material which is reactive with halogen-based gas, such as oxides or nitrides of silicon (Si), molybdenum (Mo), chromium (Cr), tin (Sn), or zirconium (Zr), the outermost layers are likely to be etched, and therefore the reliability of devices using the optical fibers 20 and 112 decreases.

Consequently, it is preferable that the outermost layers of the films covering the tips of the optical fibers 20 and 112 be made of a material which is inert to halogen-based gas, such as oxides or nitrides of indium (In), gallium (Ga), aluminum (Al), titanium (Ti), or tantalum (Ta)

Further, the connector 124 can be filled with inert gas by introducing pressurized inert gas into the connector 124 through the valve 125, instead of using the aforementioned process of introducing the inert gas.

Furthermore, the connector 124 can be sealed by press-fitting the ferrules 113 and 114 into the sleeve tube 120, instead of using the O-rings 127 and 128.

<Second Structure>

Next, the second structure for connecting optical fibers and a manner of termination using the second structure are explained below with reference to FIG. 5, which is a cross-sectional side view of the second structure for connecting optical fibers. In this case, the termination of the optical fiber 20 is also realized by attachment of the ferrule 113.

Figure 5:
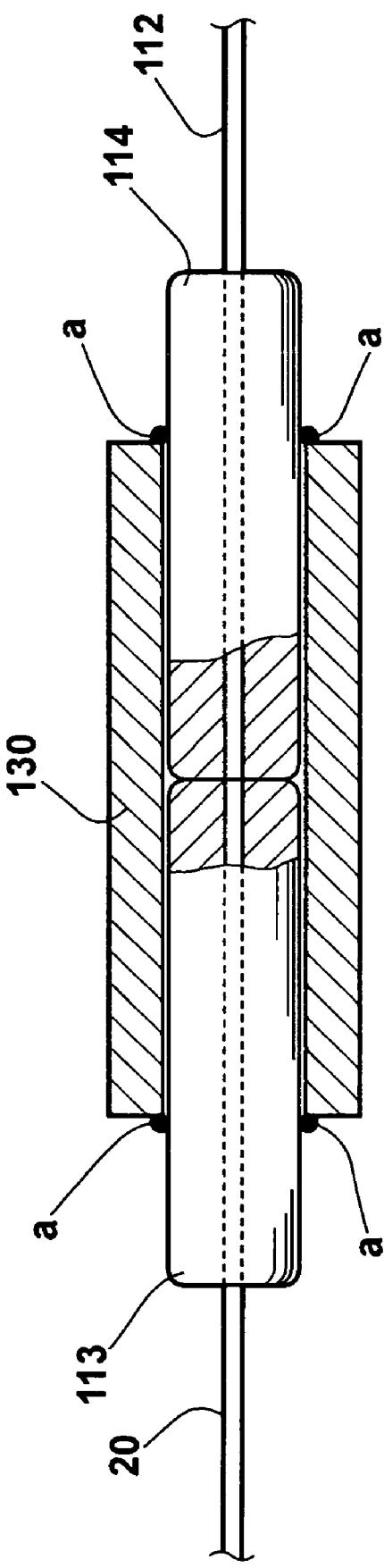
FIG. 5 is a cross-sectional side view of a second structure for connecting optical fibers.

In the second structure illustrated in FIG. 5, near-end portions of two optical fibers 20 and 112 are respectively inserted into and fixed to the ferrules 113 and 114, and the ferrules 113 and 114 are inserted into a cylindrical sleeve 130 from both ends of the cylindrical sleeve 130. In addition, the ferrules 113 and 114 are fixed to the cylindrical sleeve 130 in such a manner that the tips of the optical fiber cores are in contact with and pressed against each other. The ferrules 113 and 114 are fixed to the cylindrical sleeve 130 so that the gaps between the ferrules 113 and 114 and the cylindrical sleeve 130 are sealed along the entire circumferences of the ferrules 113 and 114, for example, at the positions indicated by black circles a in FIG. 5 by using, for example, a solder. The inside of the cylindrical sleeve 130 is filled with inert gas by fixing the ferrules 113 and 114 to the cylindrical sleeve 130 in an inert gas atmosphere.

The second structure illustrated in FIG. 5 has the same advantages as the first structure illustrated in FIG. 4 except that it is impossible to reuse and reconnect the optical fibers 20 and 112 after the optical fibers 20 and 112 are once connected by using the second structure.

In the first and second structures illustrated in FIGS. 4 and 5, it is possible to use a liquid which is transparent to the light propagating through the optical fibers 20 and 112 and is not decomposed by the light, instead of the inert gas. In this case, the advantages of the first and second structures are not changed. An example of the above liquid is pure water.

<Third Structure>

Next, the third structure for connecting optical fibers and a system for connecting the optical fibers and containing the third structure are explained below with reference to FIGS. 6 and 7, which are a schematic perspective view and a cross-sectional side view of the third structure for connecting optical fibers and a peripheral system.

Figure 6:
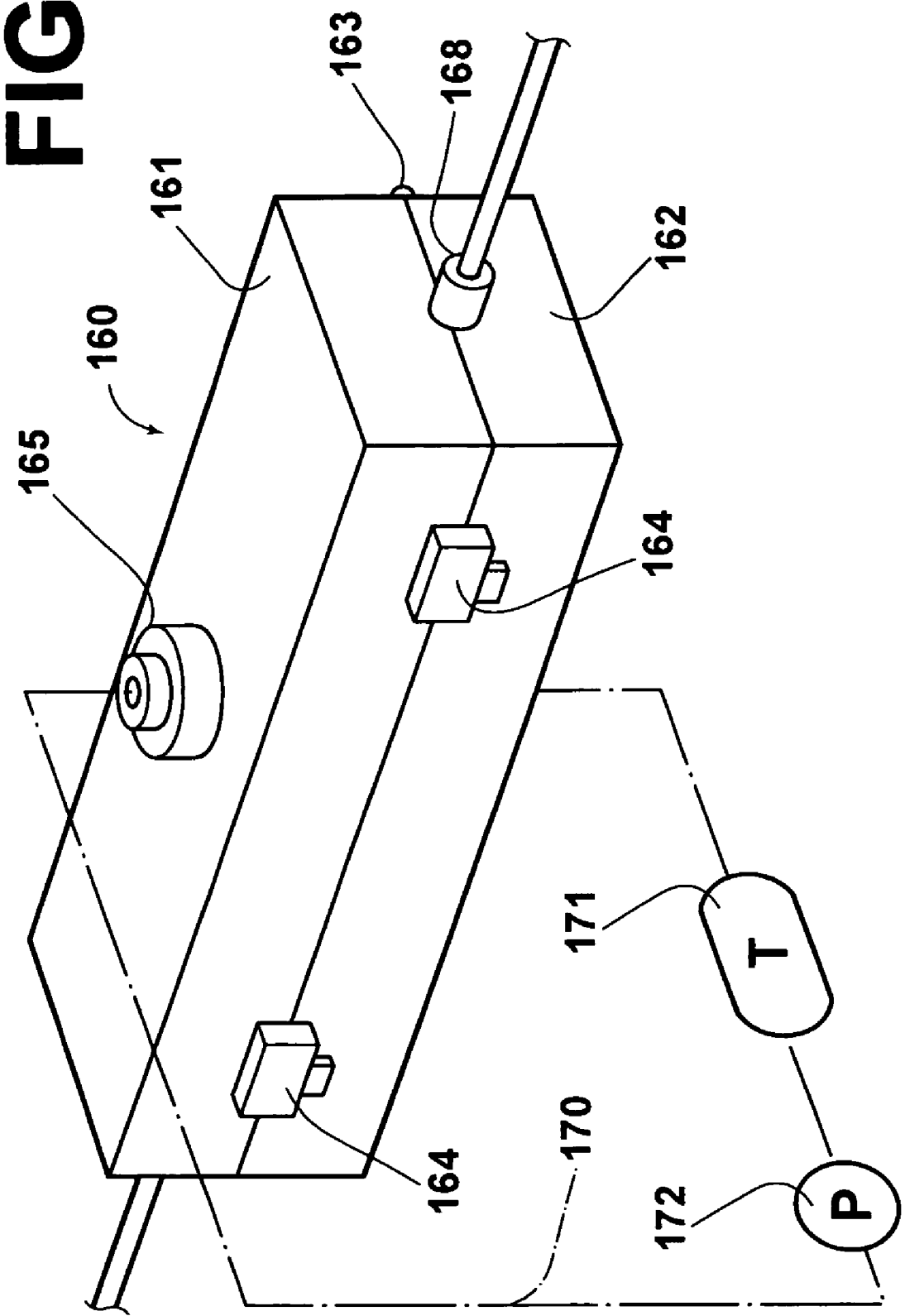
FIG. 6 is a schematic perspective view of a third structure for connecting optical fibers and a peripheral system.
Figure 7:
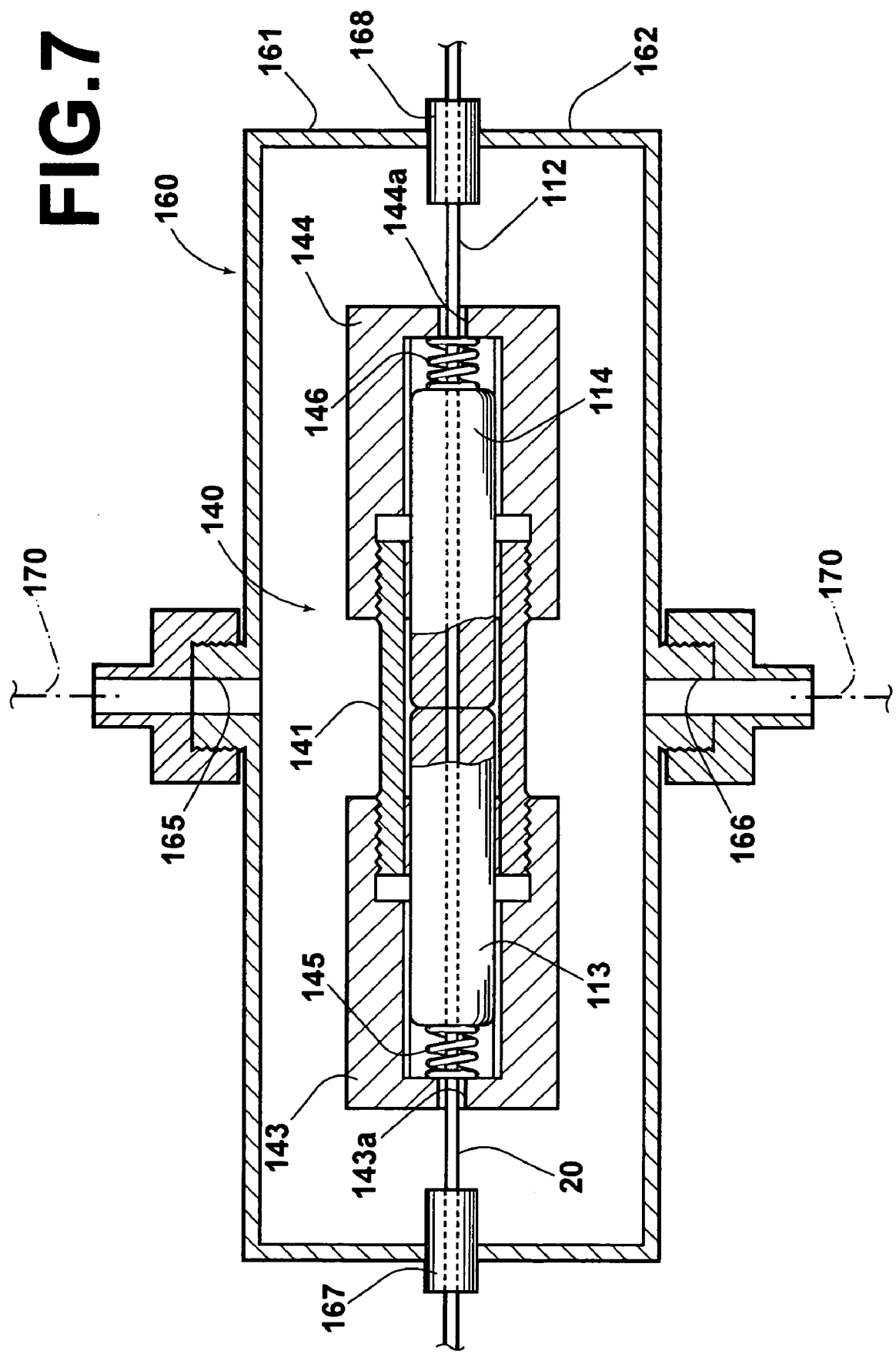
FIG. 7 is a cross-sectional side view of the third structure for connecting optical fibers.

In the system containing the third structure illustrated in FIGS. 6 and 7, a general connector 140 is contained in a container 160, and the peripheral system is provided for circulating inert gas through the container 160.

In the third structure, as illustrated in FIG. 7, near-end portions of two optical fibers 20 and 112 are respectively inserted into and fixed to the ferrules 113 and 114, and the ferrules 113 and 114 are inserted into a sleeve tube 141 from both ends of the sleeve tube 141. In addition, outer tubes 143 and 144 hold the rear portions of the ferrules 113 and 114, respectively. In addition, the outer tubes 143 and 144 have through holes through which the optical fibers 20 and 112 pass. Further, a compression spring 145 is arranged between the bottom of the outer tube 143 and the ferrule 113, and a compression spring 146 is arranged between the bottom of the outer tube 144 and the ferrule 114. That is, the termination of the optical fiber 20 is realized by attaching the ferrule 113, the outer tube 143, and the compression spring 145 to the optical fiber 20.

Male threads are formed on both near-end portions of the outer surface of the sleeve tube 141, and female threads are formed on near-end portions of the internal surfaces of the outer tubes 143 and 144 so that the female threads engage with the male threads.

The structure illustrated in FIGS. 6 and 7 is realized as follows.

First, the front portions of the ferrules 113 and 114 are inserted into the sleeve tube 141, and the rear portions of the ferrules 113 and 114 are respectively inserted into the outer tubes 143 and 144. Thereafter, the outer tubes 143 and 144 are engaged with the sleeve tube 141 by screwing the outer tubes 143 and 144 onto the sleeve tube 141 until the tips of the ferrules 113 and 114 come into contact. Then, the outer tubes 143 and 144 are further screwed forward on the sleeve tube 141 so that the tips of the ferrules 113 and 114 (i.e., the tips of the optical fibers 20 and 112) are pressed against each other. Thus, the optical fibers 20 and 112 are optically connected.

The container 160 has a two-part structure constituted by an upper part 161 and a lower part 162. The upper and lower parts 161 and 162 are swingably connected by hinges 163, and can be integrally fixed to each other by using latches 164. A gas inlet 165 and a gas outlet 166 are arranged in the upper and lower parts 161 and 162, respectively. Half-round openings are formed in opposite side walls of each of the upper and lower parts 161 and 162 so that cylindrical fiber passages 167 and 168 can be arranged through round openings in opposite side walls of the container 160, where the round openings are realized by the half-round openings when the upper and lower parts 161 and 162 are integrally fixed to each other. The fiber passages 167 and 168 are formed of an elastic material such as fluorocarbon rubber, and have through holes through which the optical fibers 20 and 112 can be drawn in such a manner that the round openings in the opposite side walls of the container 160 are airtightly closed with the fiber passages 167 and 168 and the optical fibers 20 and 112 when the upper and lower parts 161 and 162 are integrally fixed to each other.

The gas inlet 165 and the gas outlet 166 are connected to gas-circulation piping 170. A tank 171 and a gas pump 172 are arranged in the gas-circulation piping 170, where the tank 171 stores the inert gas as mentioned before, and the gas pump 172 supplies the inert gas into the container 160. In the example illustrated in FIG. 6, a fluid circulation system is realized by the gas-circulation piping 170 with the tank 171 and the gas pump 172.

Before the optical fibers 20 and 112 are optically connected by using the connector 140 in the aforementioned manner, the optical fibers 20 and 112 are respectively threaded through the fiber passages 167 and 168. The connector 140 is held on the bottom surface of the lower part 162. Thereafter, the upper and lower parts 161 and 162 are integrally fixed to each other and tightly sealed by covering the lower part 162 with the upper part 161 and setting the latches 164. Thus, the connector 140 in which the tips of the optical fibers 20 and 112 are optically connected is contained in the container 160. In addition, in order to secure the airtightness between the upper and lower parts 161 and 162, it is preferable that the edges of the upper and lower parts 161 and 162 which are to be brought into contact be coated with an elastic material such as fluorocarbon rubber.

After the connector 140 is contained in the container 160, the gas pump 172 is activated, so that the inert gas stored in the tank 171 circulates through the container 160. It is preferable that the inert gas be the same as that used in the first structure for connecting optical fibers.

In the case where the connector 140 is filled with the inert gas as mentioned before, and at least portions of the tips of the cores of the optical fibers 20 and 112 are not in contact, the at least portions are surrounded by the inert gas. Therefore, organic materials and the like which cause the afore- mentioned dust collection effect do not exist around the tips of the optical fibers 20 and 112, and thus the light propagating through the optical fibers 20 and 112 does not cause the photochemical reaction. That is, the dust collection effect at the tips of the optical fibers 20 and 112 can be suppressed.

In this example, laser light having a wavelength in the range of 350 to 500 nm, which is likely to cause the dust collection effect, propagates through the optical fibers 20 and 112. Therefore, use of the structure illustrated in FIGS. 6 and 7 is particularly effective.

In the case where the container 160 containing the connector 140 is degassed before the inert gas is introduced into the container 160, it is possible to suppress the dust collection effect with higher reliability.

In the structure illustrated in FIGS. 6 and 7, the optical fibers 20 and 112 are not fused. Therefore, the optical fibers 20 and 112 can be easily connected without an elaborated fusion machine. In addition, the ferrules 113 and 114 can be easily detached from the connector 140 by loosening and taking out the outer tubes 143 and 144. Therefore, it is possible to easily reconnect the optical fibers 20 and 112 after the optical fibers are once connected.

In addition, in the structure illustrated in FIGS. 6 and 7, the optical fibers 20 and 112 can be automatically brought into coaxial alignment by simply inserting the ferrules 113 and 114 into the sleeve tube 141, which guides the ferrules 113 and 114. Therefore, the operation for aligning the optical fibers can be performed easily.

When the inert gas contains one or a mixture of oxygen gas, halogen gas, and halide gas at a concentration of 1 ppm or higher, it is possible to obtain the same advantages as obtained in the first structure illustrated in FIG. 4.

Further, as in the first and second structures illustrated in FIGS. 4 and 5, it is possible to use a liquid (e.g., pure water) which is transparent to the light propagating through the optical fibers 20 and 112 and is not decomposed by the light, instead of the inert gas.

Furthermore, it is possible to close the container 160 by closing or dispensing with the gas inlet 165 and the gas outlet 166, and fill the container 160 with inert gas or a liquid such as pure water.

<Fourth Structure>

Next, the fourth structure for connecting optical fibers and a manner of termination using the fourth structure are explained below with reference to FIG. 8, which is a cross-sectional side view of the fourth structure for connecting optical fibers.

Figure 8:
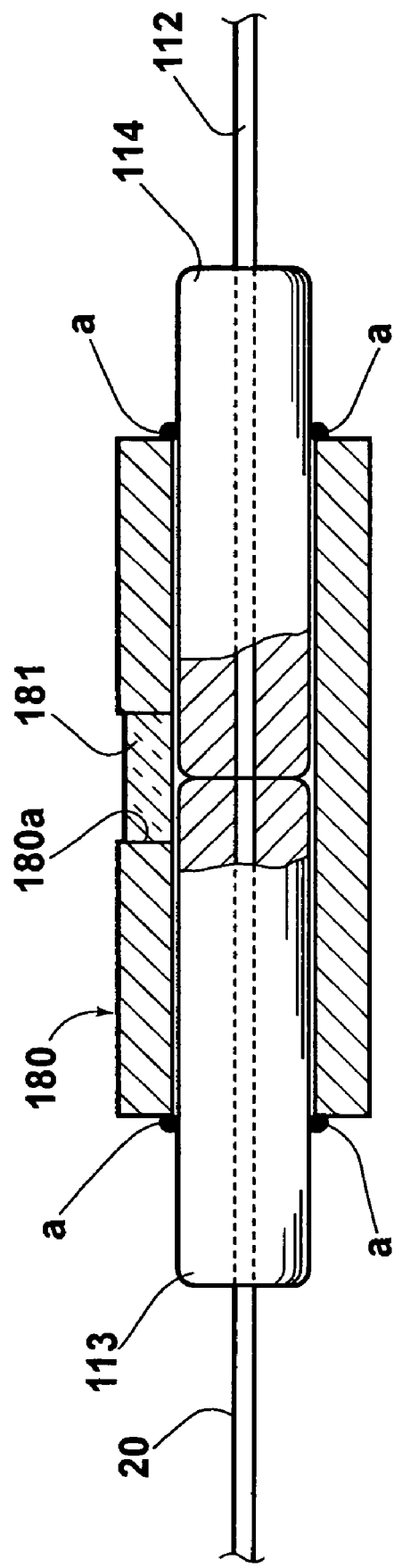
FIG. 8 is a cross-sectional side view of a fourth structure for connecting optical fibers.

In the fourth structure illustrated in FIG. 8, near-end portions of two optical fibers 20 and 112 are respectively inserted into and fixed to the ferrules 113 and 114, and the ferrules 113 and 114 are inserted into a cylindrical sleeve 180 from both ends of the cylindrical sleeve 180. In addition, the ferrules 113 and 114 are fixed to the cylindrical sleeve 180 in such a manner that the tips of the optical fiber cores are in contact with and pressed against each other. The ferrules 113 and 114 are respectively fixed to the cylindrical sleeve 180 so that the gaps between the ferrules 113 and 114 and the cylindrical sleeve 180 are sealed along the entire circumferences of the ferrules 113 and 114, for example, at the positions indicated by black circles a in FIG. 8 by using, for example, a solder.

In the example of FIG. 8, the termination of the optical fiber 20 is also realized by attachment of the ferrule 113.

An opening 180a is formed at approximately the center of the length of the cylindrical sleeve 180. After the ferrules 113 and 114 are fixed to the cylindrical sleeve 180, molten low-melting-point glass 181 is poured into the opening 180a. The flux of the molten low-melting-point glass 181 pushes out air from the vicinities of the tips of the optical fibers 20 and 112, spreads through the vicinities of the tips, gradually cools, and then solidifies.

In this example, laser light having a wavelength in the range of 350 to 500 nm propagates through the optical fibers 20 and 112. The low-melting-point glass 181 is transparent to the light propagating through the optical fibers 20 and 112 and is not decomposed by the light.

As indicated above, in the fourth structure illustrated in FIG. 8, the tips of the optical fibers 20 and 112 including the tips of the cores are isolated from the outside by the low-melting-point glass 181 which is solidified after the molten low-melting-point glass 181 is supplied to the vicinities of the tips of the optical fibers 20 and 112. Therefore, in the case where at least portions of the tips of the cores of the optical fibers 20 and 112 are not in contact, the at least portions are in contact with the low-melting-point glass 181. Thus, organic materials and the like which cause the aforementioned dust collection effect do not exist around the tips of the optical fibers 20 and 112, and the light propagating through the optical fibers 20 and 112 does not cause the photochemical reaction. That is, the dust collection effect at the tips of the optical fibers 20 and 112 can be reliably suppressed.

Additional Matters (1) The number of laser beams combined in the optical fiber is not limited to the number (eight) indicated in the first and second embodiments, and can be any number. In particular, the present invention can be applied to laser modules in each of which combining of laser beams is not performed, and a single laser beam emitted from a single semiconductor laser element is coupled to an optical fiber. In this case, it is also possible to achieve the aforementioned advantage of prevention of contamination.

(2) This application is based upon and claims the benefits of priority from the Japanese patent application No. 2004-235944, the entire contents of which are incorporated herein by reference.

While the description above refers to particular embodiments of the present invention, it will be understood that many modifications may be made without departing from the spirit thereof. The accompanying claims are intended to cover such modifications as would fall within the true scope and spirit of the present invention.

The presently disclosed embodiments are therefore to be considered in all respects as being illustrative and not restrictive, the scopr of the invention beind indicated by the appended claims, rather than by the foregoing description. All changes that fall within the meaning and range of equivalency of the claims are therefor intended to be embraced therein.

For example, the laser module according to the first and second aspects of the present invention may also have one or any possible combination of the following additional features (i) to (ix).

(i) The wall includes a first portion on which the second package is fixed and second portions which are located in vicinities of edges of the wall, have a smaller thickness than the first portion, and are fixed to edges of side walls of the first package by welding.

(ii) At least one of the first and second package is hermetically sealed by one of fusion, welding, soldering using a flux-free solder, and adhesion using an adhesive which does not contain a silicon-based organic material.

(iii) At least one of the first and second package is filled with inert gas.

(iv) In the laser module having the feature (iii), the inert gas contains one or a mixture of oxygen gas, halogen gas, and halide gas at a concentration of 1 ppm or higher.

(v) The one or more semiconductor laser elements have an oscillation wavelength of 350 to 500 nm.

(vi) The one or more semiconductor laser elements are realized by an array of (discrete) single-cavity semiconductor laser elements, or a single multi-cavity semiconductor laser element, or an array of multi-cavity semiconductor laser elements, or a combination of at least one single-cavity semiconductor laser element and at least one multi-cavity semiconductor laser element.

(vii) The one or more semiconductor laser elements emit a plurality of laser beams which are combined into a single laser beam in the optical fiber.

(viii) The one or more semiconductor laser elements have light-emission axes and are arranged so that the plurality of laser beams emitted from the one or more semiconductor laser elements are two-dimensionally arrayed along a plane perpendicular to the light-emission axes.

(ix) The optical fiber has a light-emission end face which is terminated with a connector.

(3) In the case where the wall in which the window of the first package is formed is fixed to the edges of the side walls of the first package by welding, the weld distortion increases with the volume of the weld region. When the weld distortion is great, misalignment can occur between the optical axes of the optical elements contained in the first package, or between the optical elements contained in the first and second packages because of misalignment between the first and second packages.

Therefore, according to the aforementioned additional feature (i), the thickness of the peripheral (second) portions of the wall in which the window of the first package is formed is small compared with the thickness of the first portion of the wall on which the second package is fixed. In this case, when the peripheral (second) portions of the wall are fixed to the edges of the side walls of the first package by welding, it is possible to suppress the weld distortion, and prevent the above-mentioned misalignment between the optical axes. In addition, since the first portion of the wall on which the second package is fixed is thick compared with the peripheral (second) portions of the wall, it is possible to prevent deformation of the first portion of the wall on which the second package is fixed, although the first portion is likely to deform if the strength of the first portion of the wall against deformation is small.

(4) In the case where one or both of the first and second packages are hermetically sealed by one of fusion, welding, soldering using a flux-free solder, and adhesion using an adhesive which does not contain a silicon-based organic material, it is possible to suppress emanation of volatile components which causes contamination, and prevent contamination of the semiconductor laser elements and the like.

(5) In the case where one or both of the first and second packages are filled with inert gas, it is possible to prevent entry of contaminated gas into the first and/or second packages. Further, in the case where the inert gas contains one or a mixture of oxygen gas, halogen gas, and halide gas at a concentration of 1 ppm or higher, the effect of preventing contamination is enhanced since oxygen gas, halogen gas, and halide gas cause decomposition of hydrocarbon components and the like.

(6) In the case where the one or more semiconductor laser elements have an oscillation wavelength of 350 to 500 nm, the optical energy is great, and the dust collection effect is enhanced. Since the deposition of contaminants is prevented according to the present invention, the present invention is particularly effective at preventing deposition of contaminants in laser modules in which laser beams having an oscillation wavelength in the above range are used.

(7) In the case where the one or more semiconductor laser elements emit a plurality of laser beams which are combined into a single laser beam in the optical fiber, the optical density at the light-entrance end face of the optical fiber becomes very high, and therefore the dust collection effect is enhanced. Thus, the present invention is particularly effective at preventing deposition of contaminants in the laser modules in which the one or more semiconductor laser elements are arranged as above.

(8) If a package containing substantially all optical components of a laser module is used in the case where one or more semiconductor laser elements are arranged so that a plurality of laser beams emitted from the one or more semiconductor laser elements are two-dimensionally arrayed along a plane perpendicular to the light-emission axes of the one or more semiconductor laser elements, the volume of the package becomes large. Since the total volume of the hermetically sealed packages according to the present invention is small, the present invention is particularly effective at reducing the cost of the laser modules in which the one or more semiconductor laser elements are arranged as above.

What is claimed is:

1. A laser module comprising:
    one or more semiconductor laser elements which emit one or more divergent laser beams;
    one or more collimator lenses which collimate said one or more divergent laser beams to obtain one or more collimated laser beams;
    an optical condensing system which is constituted by one or more lenses, condenses said one or more collimated laser beams, and make the one or more collimated laser beams converge at a convergence position;
    an optical fiber which has a light-entrance end face and is arranged in such a manner that said convergence position is located on the light-entrance end face;
    a first package which contains said one or more semiconductor laser elements and said one or more collimator lenses, is hermetically sealed, and has a wall in which a window is formed so as to allow passage of said one or more collimated laser beams through the window, and a first cross section perpendicular to an optical axis of the optical fiber at the light-entrance end face; and
    a second package which is fixed to said wall, has a second cross section parallel to and smaller than said first cross section, contains at least a portion of said one or more lenses constituting said optical condensing system and a portion of said optical fiber containing said light-entrance end face, and is hermetically sealed;
    wherein said wall includes:
        a first portion on which said second package is fixed, and
        second portions which are located in vicinities of edges of the wall, have a smaller thickness than said first portion, and are fixed to edges of side walls of said first package by welding.

2. A laser module according to claim 1, wherein at least one of said first and second package is hermetically sealed by one of fusion, welding, soldering using a flux-free solder, and adhesion using an adhesive which does not contain a silicon-based organic material.

3. A laser module according to claim 1, wherein at least one of said first and second package is filled with inert gas.

4. A laser module according to claim 3, wherein said inert gas contains one or a mixture of oxygen gas, halogen gas, and halide gas at a concentration of 1 ppm or higher.

5. A laser module according to claim 1, wherein said one or more semiconductor laser elements have an oscillation wavelength of 350 to 500 nm.

6. A laser module according to claim 1, wherein said one or more semiconductor laser elements are realized by an array of single-cavity semiconductor laser elements, or a single multi-cavity semiconductor laser element, or an array of multi-cavity semiconductor laser elements, or a combination of at least one single-cavity semiconductor laser element and at least one multi-cavity semiconductor laser element.

7. A laser module according to claim 1, wherein said one or more semiconductor laser elements emit a plurality of laser beams which are combined into a single laser beam in said optical fiber.

8. A laser module according to claim 1, wherein said one or more semiconductor laser elements have light-emission axes and are arranged so that said plurality of laser beams emitted from the one or more semiconductor laser elements are two-dimensionally arrayed along a plane perpendicular to the light-emission axes.

9. A laser module according to claim 1, wherein said optical fiber has a light-emission end face which is terminated with a connector.

10. A laser module comprising:
    one or more semiconductor laser elements which emit one or more divergent laser beams;
    one or more condensing lenses which condense said one or more divergent laser beams so as to make the one or more divergent laser beams converge at a convergence position;
    an optical fiber which has a light-entrance, end face and is arranged in such a manner that said convergence position is located on the light-entrance end face;
    a first package which contains said one or more semiconductor laser elements and said one or more condensing lenses, is hermetically sealed, and has a wall in which a window is formed so as to allow passage, through the window, of said one or more divergent laser beams condensed by said one or more condensing lenses, and a first cross section perpendicular to an optical axis of the optical fiber at the light-entrance end face; and
    a second package which is fixed to said wall, has a second cross section parallel to and smaller than said first cross section, contains a portion of said optical fiber containing said light-entrance end face, and is hermetically sealed;
    wherein said wall includes:
        a first portion on which said second package is fixed, and
        second portions which are located in vicinities of edges of the wall, have a smaller thickness than said first portion, and are fixed to edges of side walls of said first package by welding.

11. A laser module according to claim 10, wherein at least one of said first and second package is hermetically sealed by one of fusion, welding, soldering using a flux-free solder, and adhesion using an adhesive which does not contain a silicon-based organic material.

12. A laser module according to claim 10, wherein at least one of said first and second package is filled with inert gas.

13. A laser module according to claim 12, wherein said inert gas contains one or a mixture of oxygen gas, halogen gas, and halide gas at a concentration of 1 ppm or higher.

14. A laser module according to claim 10, wherein said one or more semiconductor laser elements have an oscillation wavelength of 350 to 500 nm.

15. A laser module according to claim 10, wherein said one or more semiconductor laser elements are realized by an array of single-cavity semiconductor laser elements, or a single multi-cavity semiconductor laser element, or an array of multi-cavity semiconductor laser elements, or a combination of at least one single-cavity semiconductor laser element and at least one multi-cavity semiconductor laser element.

16. A laser module according to claim 10, wherein said one or more semiconductor laser elements emit a plurality of laser beams which are combined into a single laser beam in said optical fiber.

17. A laser module according to claim 10, wherein said one or more semiconductor laser elements have light-emission axes and are arranged so that said plurality of laser beams emitted from the one or more semiconductor laser elements are two-dimensionally arrayed along a plane perpendicular to the light-emission axes.

18. A laser module according to claim 10, wherein said optical fiber has a light-emission end face which is terminated with a connector.

* * * * *